(12) United States Patent  
McCarthy et al.

(10) Patent No.: US 8,621,538 B2  
(45) Date of Patent: *Dec. 31, 2013

(54) METHOD AND SYSTEM FOR PROVIDING SUBSCRIPTION DATA

(71) Applicant: AT&T Intellectual Property I, L.P., Atlanta, GA (US)

(72) Inventors: Mary McCarthy, San Antonio, TX (US); Roland Noll, San Antonio, TX (US); Bryan M. Cardenas, Helotes, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,992

(22) Filed: Feb. 28, 2013

(65) Prior Publication Data

US 2013/0179915 A1    Jul. 11, 2013

Related U.S. Application Data

(63) Continuation of application No. 11/876,475, filed on Oct. 22, 2007.

(51) Int. Cl.  
*H04N 7/173* (2011.01)

(52) U.S. Cl.  
USPC ............. 725/110; 725/1; 725/34; 725/35; 725/40; 725/46; 725/47; 725/51; 725/133; 725/153; 704/251; 348/468

(58) Field of Classification Search  
None  
See application file for complete search history.

(56) References Cited

U.S. PATENT DOCUMENTS

| | | |
|---|---|---|
| 6,239,794 B1 | 5/2001 | Yuen |
| 6,282,713 B1 | 8/2001 | Kitsukawa |
| 7,237,252 B2 | 6/2007 | Billmaier |
| 2003/0028873 A1 | 2/2003 | Lemmons |
| 2005/0120371 A1 | 6/2005 | Kimura |
| 2007/0130589 A1 | 6/2007 | Davis |
| 2007/0157228 A1 | 7/2007 | Bayer |
| 2007/0162926 A1 | 7/2007 | Steelberg |
| 2007/0199017 A1 | 8/2007 | Cozen |
| 2007/0214477 A1 | 9/2007 | Read |
| 2008/0168503 A1 | 7/2008 | Sparrell |
| 2009/0022476 A1 | 1/2009 | Nonoyama |
| 2009/0138924 A1 | 5/2009 | Eastes |

FOREIGN PATENT DOCUMENTS

| | | |
|---|---|---|
| WO | WO2006/090327 | 8/2006 |
| WO | WO2007/097387 | 8/2007 |

*Primary Examiner* — Jason J Chung  
(74) *Attorney, Agent, or Firm* — Guntin & Gust, PLC; Andrew Gust (57) ABSTRACT

Methods and systems for providing subscription data are described. Subscription data may be received from a subscription data source. The video content may be provided for presentation. A determination may be made of whether the subscription data is contextually relevant to the video content. The subscription data may be provided for presentation in accordance with the determination and the providing of the video content.

17 Claims, 9 Drawing Sheets

METHOD AND SYSTEM FOR PROVIDING SUBSCRIPTION DATA

CROSS-REFERENCE TO RELATED APPLICATIONS

This application is a continuation of and claims priority to U.S. patent application Ser. No. 11/876,475 filed Oct. 22, 2007 which is incorporated herein by reference in its entirety.

FIELD OF THE DISCLOSURE

This application relates to a method and system for content processing, and more specifically to methods and systems for providing subscription data.

BACKGROUND

Video content is provided from a content source to users through an access device (e.g., a set-top box) and/or directly to a display device (e.g., a television). The user may receive information including news and alerts provided within the video content while watching the video content. The provided information is not defined directly or indirectly by the user but is rather defined by an operator of the content source or an originator of the video content.

BRIEF DESCRIPTION OF THE DRAWINGS

Embodiments are illustrated by way of example and not limitation in the figures of the accompanying drawings, in which like reference characters indicate similar elements and in which.

DETAILED DESCRIPTION

Example methods and systems for providing subscription data are described. In the following description, for purposes of explanation, numerous specific details are set forth in order to provide a thorough understanding of example embodiments. It will be evident, however, to one skilled in the art that the present invention may be practiced without these specific details.

In an example embodiment, subscription data may be received from a subscription data source. The video content may be provided for presentation. A determination may be made of whether the subscription data is contextually relevant to the video content. The subscription data may be provided for presentation in accordance with the determination and the providing of the video content.

Figure 1:
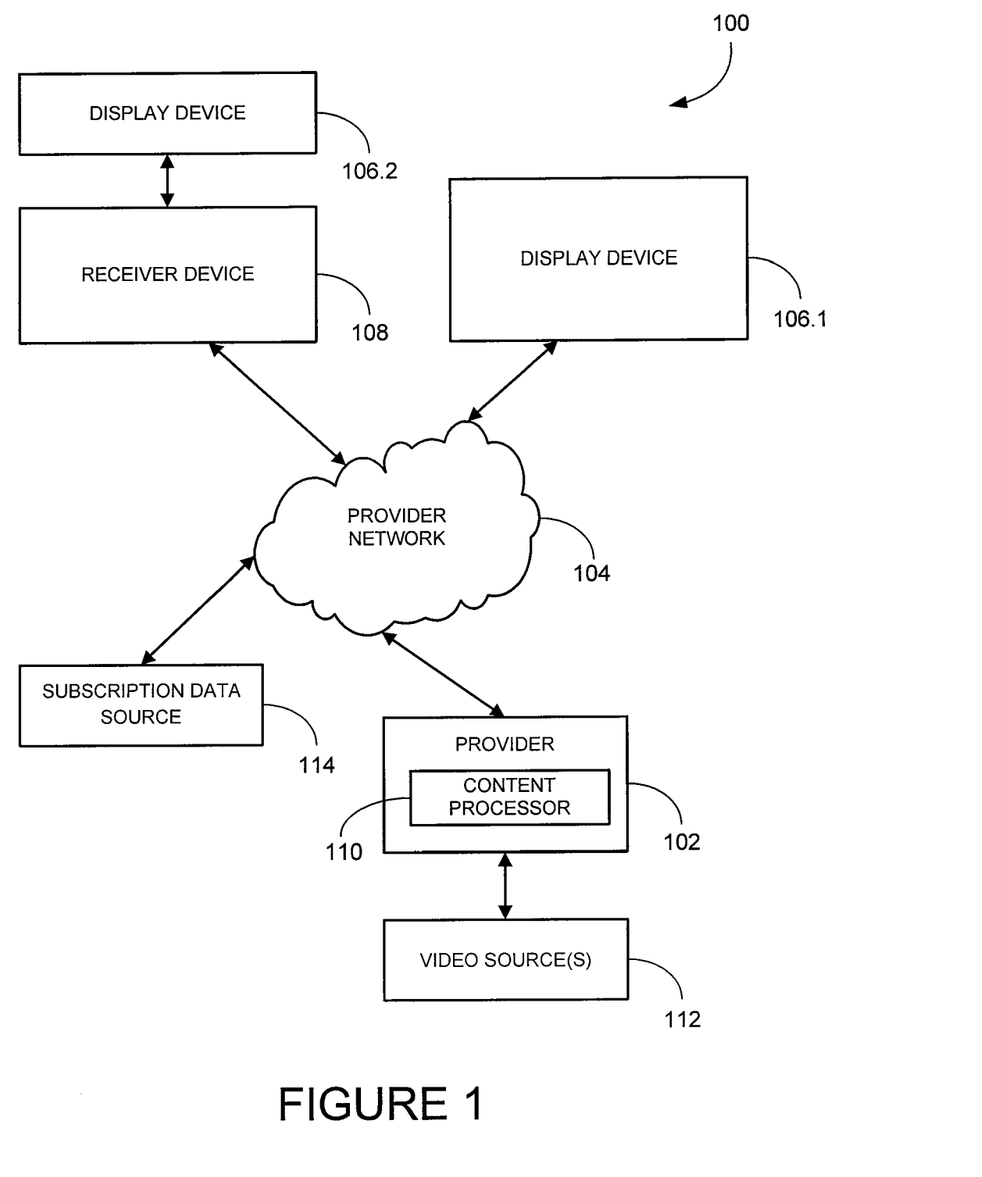
FIGS. 1 and 2 are block diagrams of an example content system according to an example embodiment.

FIG. 1 illustrates an example content system 100. The content system 100 includes a provider 102 that may provide content over a provider network 104 to a display device 106.1 and/or to a display device 106.2 through a receiver device 108.

The content may include video content in the form of a video signal. The video signal may be a sequence of images and one or more associated audio tracks. The video signal may be a high quality video stream (e.g., MPEG-4) that is transcoded for distribution to the display device 106.1 and/or the receiver device 108. The video signal may include standard definition (SD) or high definition (HD) video signals in NTSC (National Television System Committee), PAL (Phase Alternation Line), SECAM (Systeme Electronique Couleur Avec Memoire), sequence of bitmaps or other signal formats that transport a sequence of images. The form of the video signal may be modified to enable implementations of various formats and resolutions. The video signal may provide a variety of content types including, without limitation, television programs, music, movies, and commercials.

The provider 102 may be a television station, a broadcast network, a file server, a Digital Subscriber Line Access Multiplexer (DSLAM), a gateway, a switch, or the like. The provided 102 may include a content processor 110 to provide video content and associated subscription data for presentation to a user. The subscription data may be received from a subscription data source 114. An example embodiment of the content processor 110 is described in greater detail below.

The provider network 104 may be a television distribution network, Global System for Mobile Communications (GSM) network, an Internet Protocol (IP) network, a Wireless Application Protocol (WAP) network, and/or a Wifi network. Other networks may also be used.

The display device 106.1, 106.2, may be a television monitor, a mobile telephone, a portable gaming device, a personal digital assistant (PDA), a computer monitor, and the like. Other types of display devices may also be used. Examples of the receiver device 108 include a set-top box, a receiver card, a mobile phone, and a computing system; however other devices may also be used.

The subscription data source 114 may provide subscription data to the provider. The subscription data may be associated with a particular topic of an interest to a user. For example, subscription data source 114 may be an RSS syndicator or other source type of subscription data.

Figure 2:
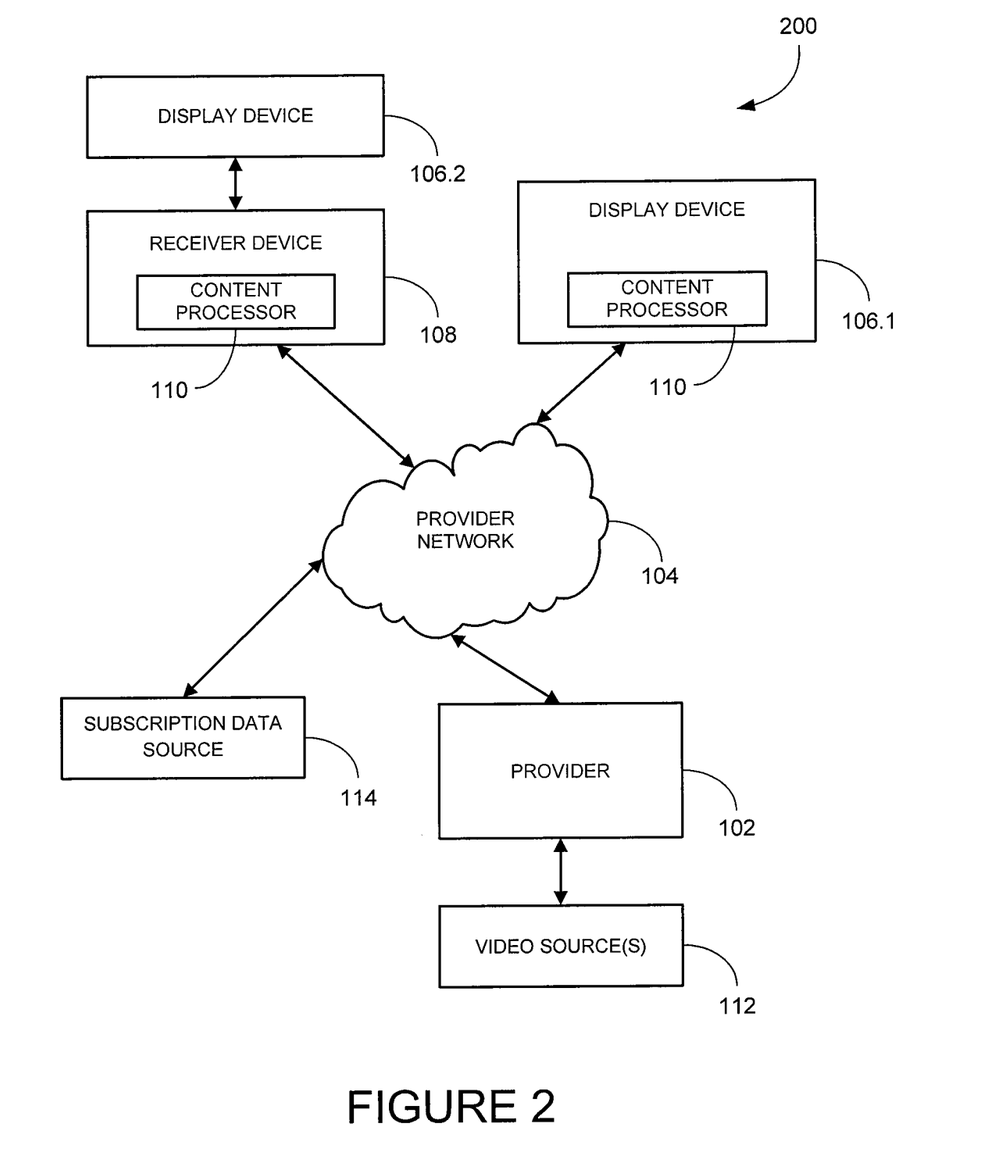

FIG. 2 illustrates an example content system 200. The content system 200 includes the provider 102 that may provide a video signal over the provider network 104 to the display device 106.1 and/or to the display device 106.2 through the receiver device 108. The content processor 110 may be embodied within the display device 106.1 and/or the receiver device 108 to enable video content and subscription data to be provided for presentation as described in greater detail below.

Figure 3:
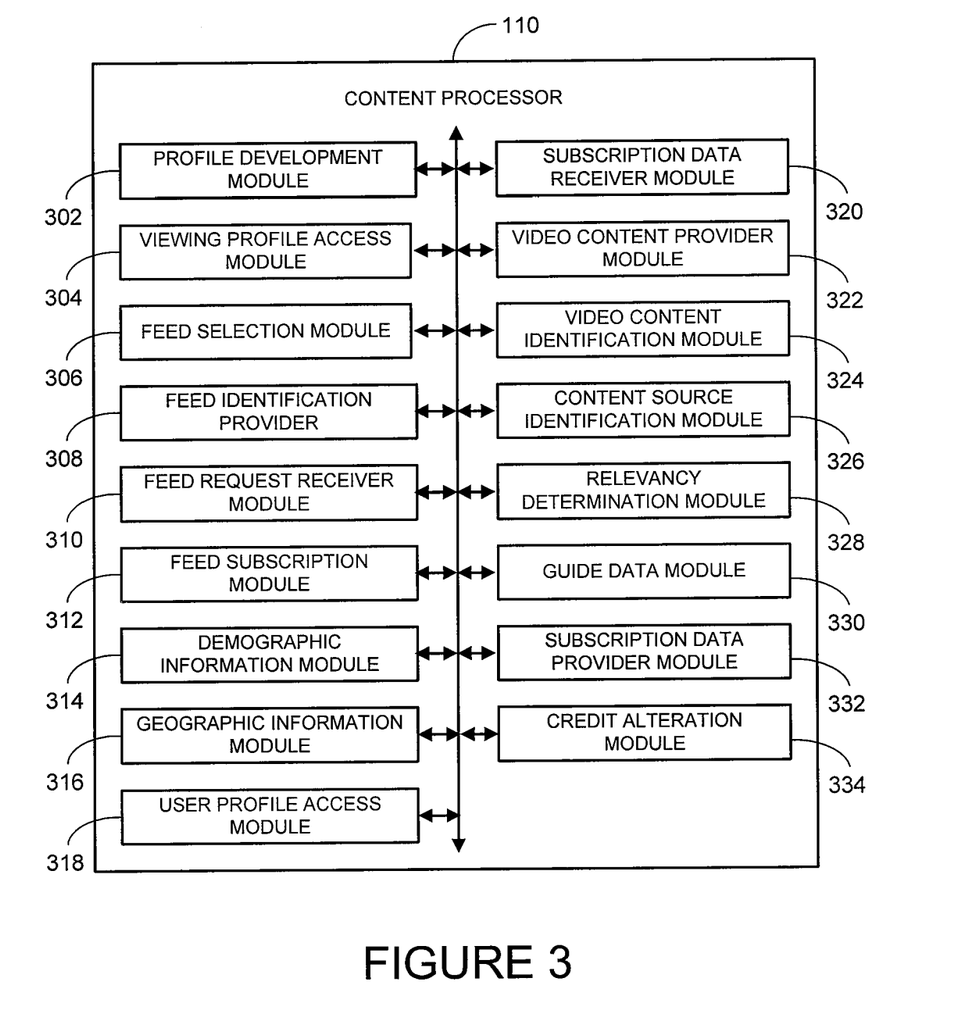
FIG. 3 is a block diagram of an example content processor that may be deployed in the content system of FIGS. 1 and 2 according to an example embodiment.

FIG. 3 illustrates an example content processor 110 that may be deployed in the content system 100, 200 (see FIGS. 1 and 2) and/or another system.

The content processor 110 may include a profile development module 302, a viewing profile access module 304, a feed selection module 306, a feed identification provider module 308, a feed request receiver module 310, a feed subscription module 312, a demographic information module 314, a geographic information module 316, a user profile access module 318, a subscription data receiver module 320, a video content provider module 322, a video content identification module 324, a content source identification module 326, a relevancy determination module 328, a guide data module 330, a subscription data provider module 332, and/or a credit alteration module 334. Other modules may also be used.

The profile development module 302 identifies previous video content provided for presentation to the user and develops a viewing profile in accordance with identification of the previous video content.

The viewing profile access module 304 accesses a viewing profile of a user. The viewing profile may be based on video content viewing habits of a user.

The feed selection module 306 selects a syndicated feed in accordance with the viewing profile of the user. The syndicated feed may be capable of providing the subscription data. The syndicated feed may be a RSS feed, an Atom feed, or a different type of syndicated feed.

The feed identification provider module 308 provides feed identification of the syndicated feed to the user. The feed indication may be provided in accordance with a viewing profile, a user profile, demographic information of the user, and/or geographic information associated with the user.

The feed request receiver module 310 receives a feed request from a user. The receiving of the feed request from the user may be in response to the feed identification. The feed request may be a request for a specific feed or a topic from which a feed is selected.

The feed subscription module 312 subscribes to the syndicated feed (e.g., in accordance with the feed request). The demographic information module 314 accesses demographic information of the user. The geographic information module 316 accesses geographic information associated with the user. The user profile access module 318 accesses a user profile associated with the user.

The subscription data receiver module 320 receives subscription data from the subscription data source 114. The subscription data may be received from the subscription data source 114 in accordance with the subscription to the syndicated feed performed by the subscription module, the viewing profile, the user profile, demographic information, and/or geographic information. The subscription data may include syndication data, textual data, and/or advertisement data. Other types of data may also be used.

The video content provider module 322 provides video content for presentation. The video content may be provided through a unicast feed and/or a multicast feed.

The video content identification module 324 identifies the video content provided for presentation to the user. The content source identification module 326 identifies a content source of the video content. The content source may include, for example, a channel selection, a broadcast network, an IPTV source, or an Internet video source. Other sources of content may also be used.

The relevancy determination module 328 makes a determination of whether the subscription data is contextually relevant to the video content. The determination of whether the subscription data is contextually relevant to the video content may be in accordance with identification of the video content and/or the content source.

The guide data module 330 accesses electronic program guide data associated with the video content. The subscription data provider module 332 provides the subscription data for presentation in accordance with the determination, the providing of the video content, electronic program guide data and/or the user profile. The subscription data may be provided for presentation in an overlapping portion of the video content. The subscription data may be provided through a unicast feed and/or a multicast feed.

Figure 4:
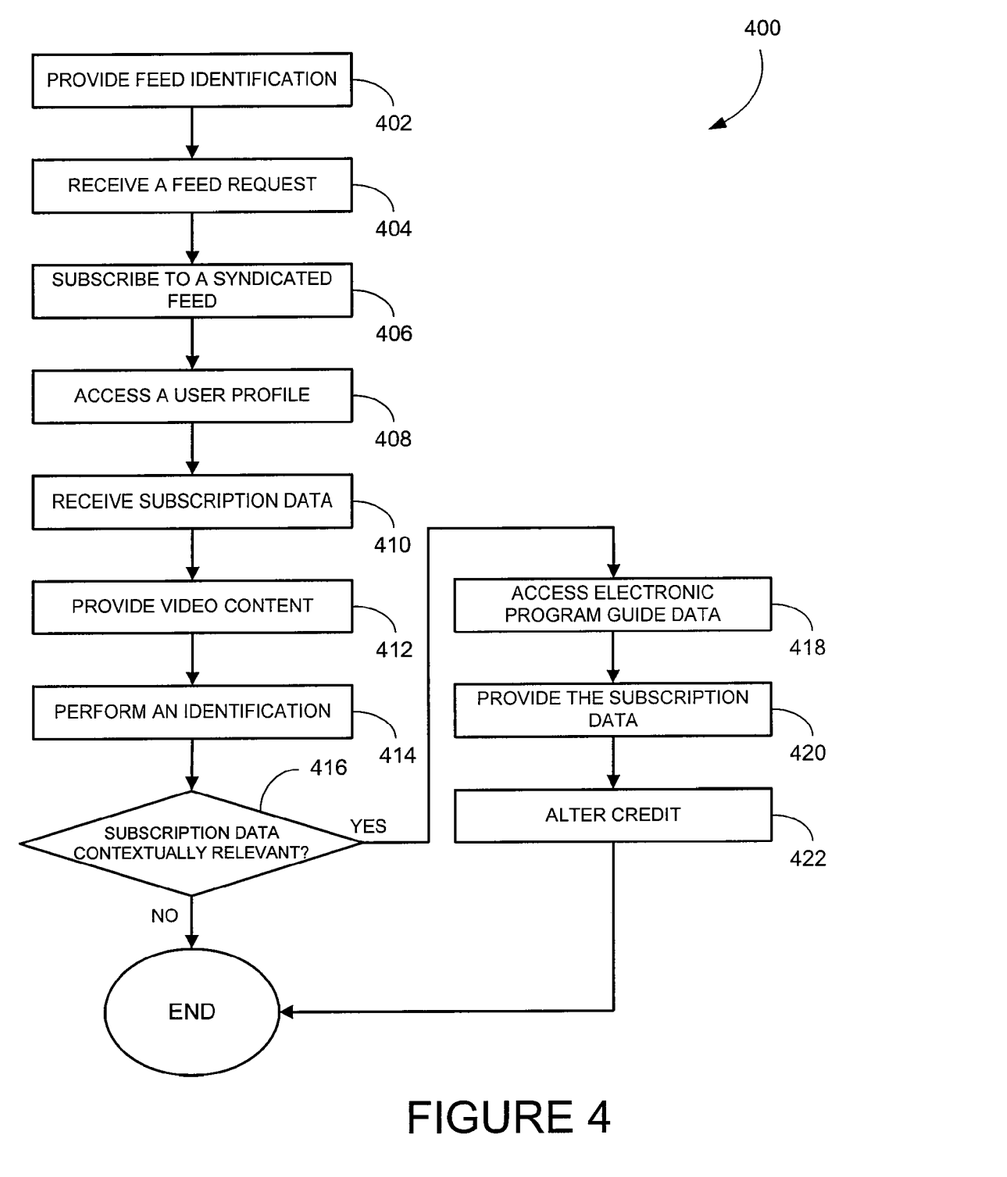
FIGS. 4, 5 and 6 are flowcharts illustrating a method for providing subscription data in accordance with an example embodiment.

The credit alteration module 334 alters credit associated with an account of the user in accordance with the providing of the subscription data by the data provider module FIG. 4 illustrates a method 400 for providing subscription data according to an example embodiment. The method 600 may be performed by the content processor 110 (see FIGS. 1 and 2) of the content systems 100, 200 or otherwise performed.

Feed identification of one or more syndicated feeds may be provided to the user at block 402. The feed identification may identify a syndication feed that is available for selection by a user. The feed indication may be provided to the user based on a viewing profile based on video content viewing habits of the user, a user profile, demographic information of the user, and/or geographic information associated with the user. The feed identification may also be provided to the user based on other information.

A feed request may be received from the user at block 404. The feed request may be a request for a specific feed or a topic from which a feed may be selected. The feed request may for a syndicated feed identified to the user through the feed indication or may be a different feed available for selection by the user.

The syndicated feed may be subscribed to in accordance with the feed request at block 406. A user profile associated with the user may be accessed at block 408. The user profile may be developed by the provider based on information known by the provider on the user. For example, the user profile may include a telephone subscription plan of the user, an Internet access plan of the user, a television access plan of the user, a record of assistance provided to the user by the provider, and the like.

Subscription data is received from the subscription data source 114 at block 410. The subscription data may include syndication data, textual data, and/or advertisement data. Other types of subscription data may also be used. The subscription data that may be received in accordance with the user profile and/or subscription to the syndicated feed.

Video content is provided for presentation at block 412. The video content may be provided through a unicast feed, a multicast feed, or through a different type of data transmission medium.

A determination of whether the subscription data is contextually relevant to the video content is made at decision block 416. If the subscription data is not contextually relevant, the method 400 may termination. If the subscription data is contextually relevant, the method 400 may proceed to block 418.

Electronic program guide data associated with the video content may be accessed at block 418.

The subscription data is provided for presentation in accordance with the determination and the providing of the video content at block 420. The subscription data may be provided for presentation in accordance with the determination, the providing of the video content, and/or the electronic program guide data. The subscription data may be provided through a unicast feed, a multicast feed, or through a different transmission medium.

The subscription data may be provided for presentation in an overlapping portion of the video content. In an example embodiment, the subscription data is provided for presentation to an additional device in accordance with the user profile.

At block 422, credit associated with an account of the user may be altered in accordance with the providing of the subscription data.

In an example embodiment, the providing of the subscription data during contextually relevant portions of the video content may enhance a user's viewing of the video content by providing the user with additional information of interest to the user while viewing the video content. For example, while watching a NFL football game, an injury report on NFL players or game statistics of football player Tony Holt may be received as subscription data and provided for presentation to the user.

Figure 5:
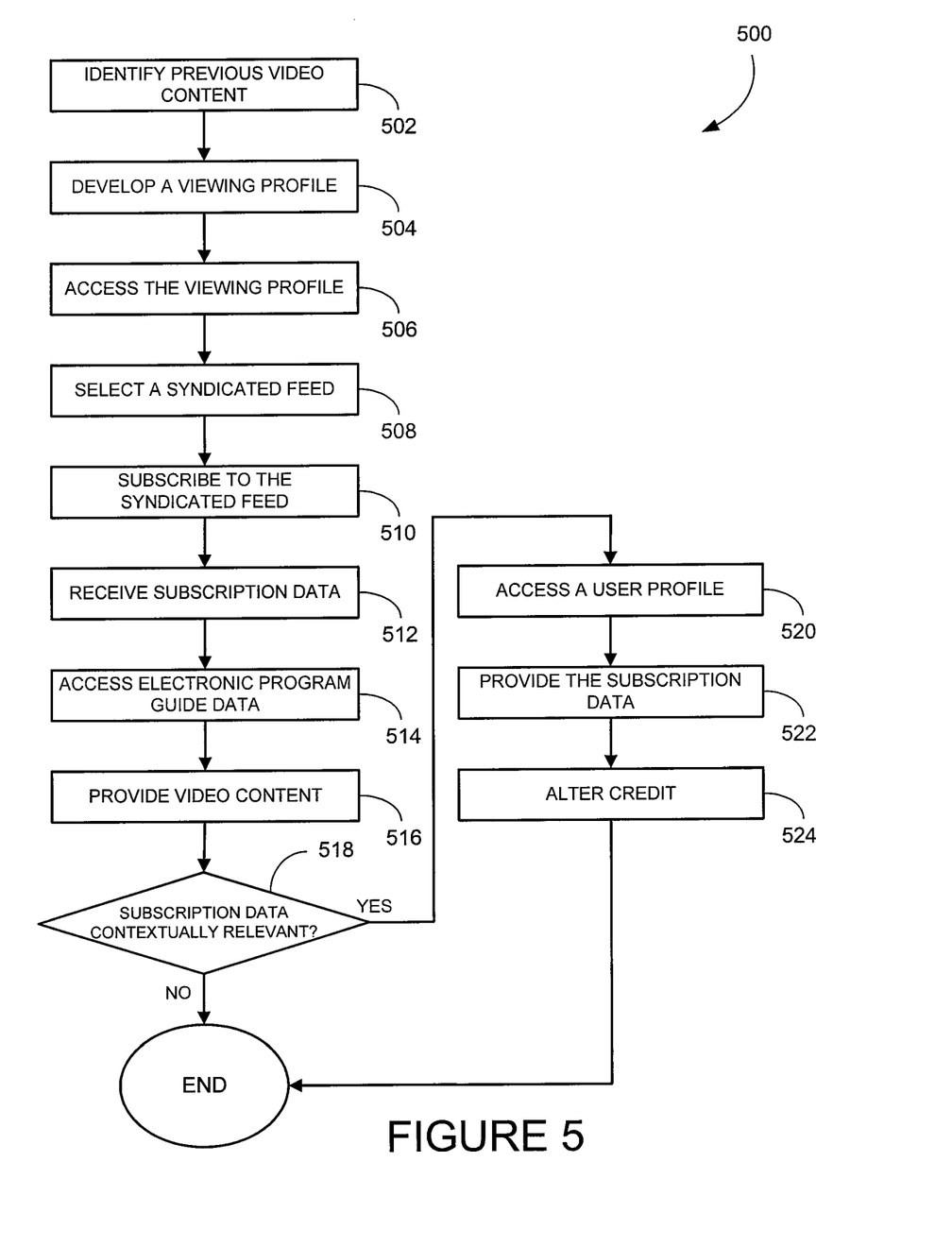

FIG. 5 illustrates a method 500 for providing subscription data according to an example embodiment. The method 500 may be performed by the content processor 110 (see FIGS. 1 and 2) of the content systems 100, 200 or otherwise performed.

Previous video content provided for presentation to the user may be identified at block 502. The previous video content may include one or more programs viewed by a user in a prior time period. The viewing profile may be developed in accordance with identification of the previous video content at block 504. The video content may be identified based on a program viewed in accordance with an electronic program guide or otherwise identifier.

A viewing profile of a user is accessed at block 506. The viewing profile may be based on video content viewing habits of a user as described during the operations at block 502 and block 504 or otherwise developed.

At block 508, a syndicated feed may be selected in accordance with the viewing profile of the user. The syndicated feed may be capable of providing the subscription data. The syndicated feed may be a RSS feed, an Atom feed, or a different type of data feed.

A subscription to the syndicated feed may be made at block 510. Subscription data may be received from the syndicated feed at block 512. The subscription data may include syndication data, textual data, and/or advertisement data. Other types of data may also be used. The subscription data received may be in accordance with the user profile and/or the viewing profile.

Electronic program guide data associated with the video content may be accessed at block 514. Video content is provided for presentation at block 516. The video content may be provided through a unicast feed, a multicast feed, or through a different type of data transmission medium.

A determination of whether the subscription data is contextually relevant to the video content is made at decision block 518. If the subscription data is not contextually relevant, the method 500 may termination. If the subscription data is contextually relevant, the method 500 may access a user profile associated with the user at block 520.

At block 522, the subscription data is provided for presentation in accordance with the determination, the electronic program guide data, and/or the providing of the video content. The subscription data may be provided through a unicast feed, a multicast feed, or through a different transmission medium.

The subscription data may be provided for presentation in an overlapping portion of the video content. In an example embodiment, the subscription data is provided for presentation to an additional device in accordance with the user profile.

At block 524, credit associated with an account of the user may be altered in accordance with the providing of the subscription data.

Figure 6:
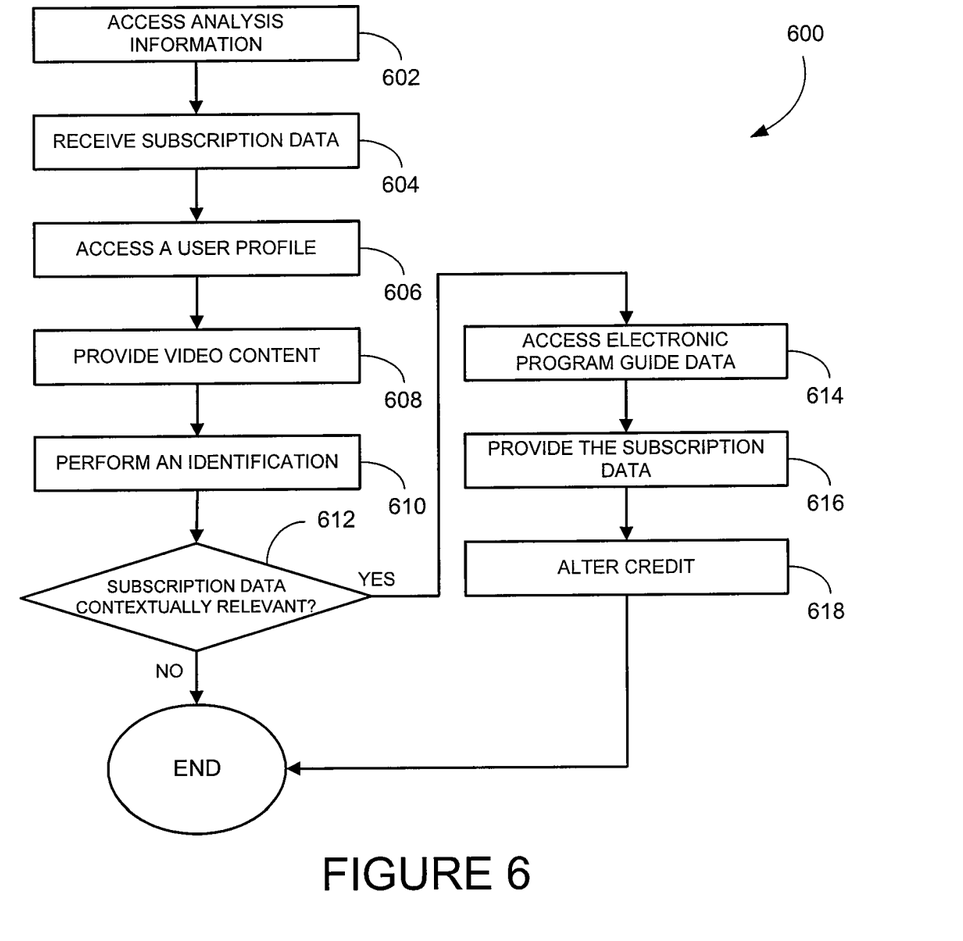

FIG. 6 illustrates a method 600 for providing subscription data according to an example embodiment. The method 600 may be performed by the content processor 110 (see FIGS. 1 and 2) of the content systems 100, 200 or otherwise performed.

Analysis information may be accessed at block 602. The analysis information may include demographic information of the user and/or geographic information associated with the user. Other types of information may also be used.

Subscription data is received at block 604. The subscription data may be received in accordance with the analysis information (e.g., the demographic and/or geographic information).

A user profile associated with the user may be accessed at block 606. Video content is provided for presentation at block 608.

An identification may be performed at block 610. The identification may include identifying the video content provided for presentation and/or a content source of the video content. The content source may be, by way of example, a channel selection, a broadcast network, an IPTV source, or an Internet video source. Other content sources may also be used.

A determination of whether the subscription data is contextually relevant to the video content is made at decision block 612. The determination of whether the subscription data is contextually relevant to the video content may be in accordance with identification of the video content and/or identification of the content source. If the subscription data is not contextually relevant, the method 600 may termination. If the subscription data is contextually relevant, the method 600 may proceed to block 614.

Electronic program guide data associated with the video content may be accessed at block 614. At block 616, the subscription data is provided for presentation in accordance with the determination, the electronic program guide data, and/or the providing of the video content. The subscription data may be provided through a unicast feed, a multicast feed, or through a different transmission medium.

The subscription data may be provided for presentation in an overlapping portion of the video content. In an example embodiment, the subscription data is provided for presentation to an additional device in accordance with the user profile.

At block 618, credit associated with an account of the user may be altered in accordance with the providing of the subscription data.

Figure 7:
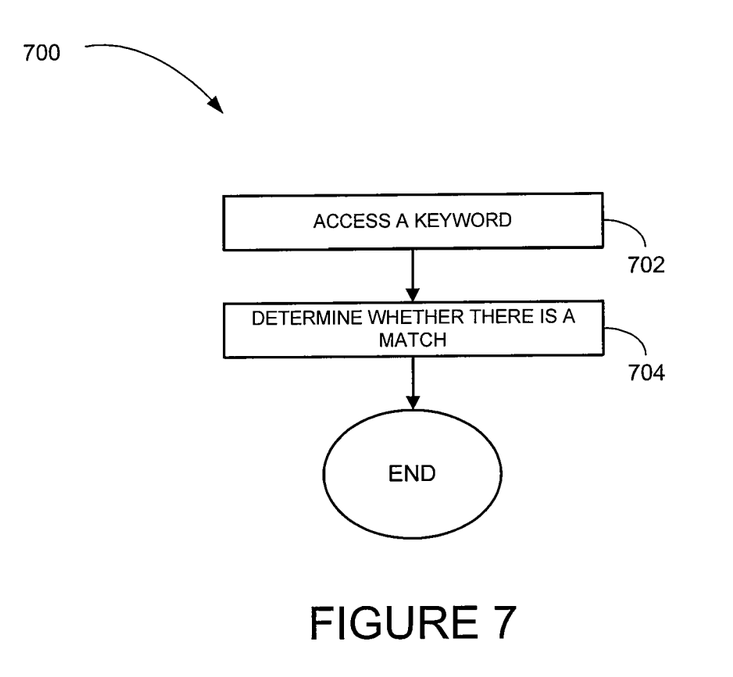
FIG. 7 is a flowchart illustrating a method for making a contextual relevancy determination in accordance with an example embodiment.

FIG. 7 illustrates a method 700 for making a contextual relevancy determination according to an example embodiment. The method 700 may be performed at the decision block 416, decision block 518, the decision block 612 or otherwise performed.

One or more keywords associated with the video content is accessed at block 702. The keywords may be accessed from, by way of example, an electronic program guide associated with the video content, closed captioning associated with the video content, metadata associated with the video content, a watermark associated with the video content, image recognition associated with the video content, and/or audio recognition associated with the video content. The keyword may be otherwise accessed.

A determination of whether there is a match with the keyword and the subscription data is preformed at block 704. Based on whether there is a match, subscription data may be provided as described in greater detail above.

Figure 8:
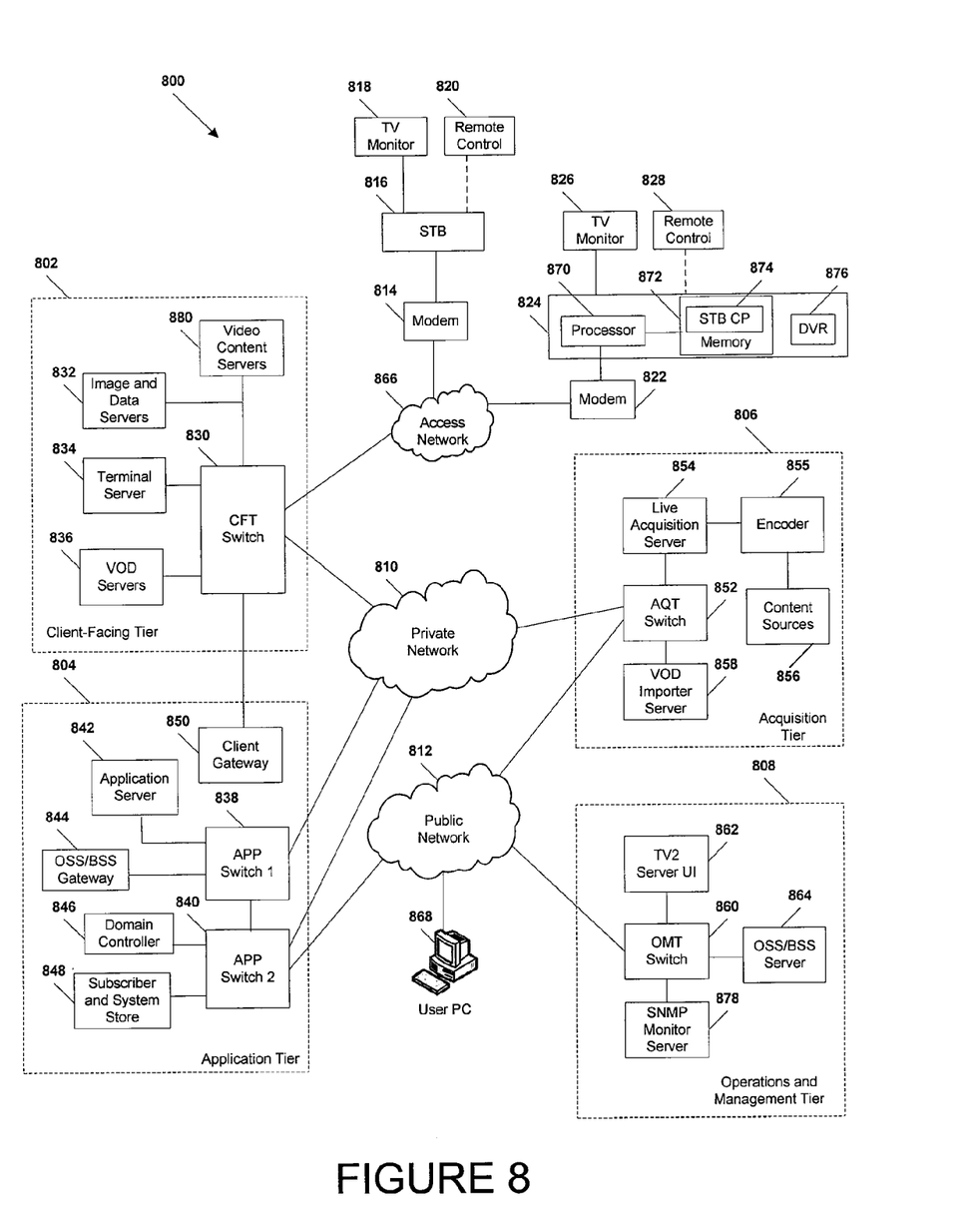
FIG. 8 is a block diagram of an IPTV system in which the content system of FIGS. 1 and 2 may be deployed in accordance with an example embodiment.

FIG. 8 illustrates an example embodiment of an Internet Protocol Television (IPTV) system 800 in which the content systems 100, 200 may be deployed. However, the content systems 100, 200 may be deployed in other types of IPTV and non-IPTV video systems.

The system 800 as illustrated may include a client facing tier 802, an application tier 804, an acquisition tier 806, and an operations and management tier 808. Some tiers 802, 804, 806, 808 may be coupled to a private network 810; to a public network 812, such as the Internet; or to both the private network 810 and the public network 812. For example, the client-facing tier 802 may be coupled to the private network 810. Further, the application tier 804 may be coupled to the private network 810 and to the public network 812. The acquisition tier 806 may also be coupled to the private network 810 and to the public network 812. Additionally, the operations and management tier 808 may be coupled to the public network 812.

As illustrated in FIG. 8, some of the various tiers 802, 804, 806, 808 may communicate with each other via the private network 810 and the public network 812. For instance, the client-facing tier 802 may communicate with the application tier 804 and the acquisition tier 806 via the private network 810. The application tier 804 may also communicate with the acquisition tier 806 via the private network 810. Further, the application tier 804 may communicate with the acquisition tier 806 and the operations and management tier 808 via the public network 812. Moreover, the acquisition tier 806 may communicate with the operations and management tier 808 via the public network 812. In a particular As illustrated in FIG. 8, the client-facing tier 802 may communicate with user equipment via a private access network 866 (e.g., the provider network 104 of FIGS. 1 and 2), such as an IPTV access network. In an illustrative embodiment, modems, such as a first modem 814 and a second modem 822 may be coupled to the private access network 866. The client-facing tier 802 may communicate with a first representative set-top box device 816 via the first modem 814 and with a second representative set-top box device 824 via the second modem 822. The client-facing tier 802 may communicate with a large number of set-top boxes, such as the representative set-top boxes 816, 824, (e.g., the receiver device 108 of FIGS. 1 and 2) over a wide geographic area, such as a regional area, a metropolitan area, a viewing area, a designated market area or any other suitable geographic area, market area, or subscriber or customer group that may be supported by networking the client-facing tier 802 to numerous set-top box devices. In an illustrative embodiment, the client-facing tier, or any portion thereof, may be included at a video head-end office.

In a particular embodiment, the client-facing tier 802 may be coupled to the modems 814, 822 via fiber optic cables. Alternatively, the modems 814 and 822 may be digital subscriber line (DSL) modems that are coupled to one or more network nodes via twisted pairs, and the client-facing tier 802 may be coupled to the network nodes via fiber-optic cables. Each set-top box device 816, 824 may process data received via the private access network 866, via an IPTV software platform, such as Microsoft® TV IPTV Edition. In another embodiment, representative set-top boxes 816, 824 may receive data from private access network 866 through RF and other cable and/or satellite based networks.

Additionally, the first set-top box device 816 may be coupled to a first external display device, such as a first television monitor 818, and the second set-top box device 824 may be coupled to a second external display device, such as a second television monitor 826. Moreover, the first set-top box device 816 may communicate with a first remote control 820, and the second set-top box device may communicate with a second remote control 828.

In an example, non-limiting embodiment, one or more of set-top box devices 816, 824 may receive video content, which may include video and audio portions, from the client-facing tier 802 via the private access network 866. The set-top boxes 816, 824 may transmit the video content to an external display device, such as the television monitors 818, 826. Further, some of the set-top box devices 816, 824 may include a STB processor, such as STB processor 870, and a STB memory device, such as STB memory 872, which is accessible to the STB processor 870. In one embodiment, a computer program, such as the STB computer program 874, may be embedded within the STB memory device 872. Some set-top box devices 816, 824 may also include a video content storage module, such as a digital video recorder (DVR) 876. In a particular embodiment, the set-top box devices 816, 824 may communicate commands received from the remote control devices 820, 828 to the client-facing tier 802 via the private access network 866.

In an illustrative embodiment, the client-facing tier 802 may include a client-facing tier (CFT) switch 830 that manages communication between the client-facing tier 802 and the private access network 866 and between the client-facing tier 802 and the private network 810. As shown, the CFT switch 830 is coupled to one or more image and data servers 832 that store still images associated with programs of various IPTV channels. The image and data servers 832 may also store data related to various channels, e.g., types of data related to the channels and to programs or video content displayed via the channels. In an illustrative embodiment, the image and data servers 832 may be a cluster of servers, some of which may store still images, channel and program-related data, or any combination thereof. The CFT switch 830 may also be coupled to a terminal server 834 that provides terminal devices with a connection point to the private network 810. In a particular embodiment, the CFT switch 830 may also be coupled to one or more video-on-demand (VOD) servers 836 that store or provide VOD content imported by the IPTV system 800. In an illustrative, non-limiting embodiment, the VOD content servers 880 may include one or more unicast servers.

The client-facing tier 802 may also include one or more video content servers 880 that transmit video content requested by viewers via their set-top boxes 816, 824. In an illustrative, non-limiting embodiment, the video content servers 880 may include one or more multicast servers.

As illustrated in FIG. 8, the application tier 804 may communicate with both the private network 810 and the public network 812. The application tier 804 may include a first application tier (APP) switch 838 and a second APP switch 840. In a particular embodiment, the first APP switch 838 may be coupled to the second APP switch 840. The first APP switch 838 may be coupled to an application server 842 and to an OSS/BSS gateway 844. In a particular embodiment, the application server 842 may provide applications to the set-top box devices 816, 824 via the private access network 866, which enable the set-top box devices 816, 824 to provide functions, such as display, messaging, processing of IPTV data and VOD material, etc. In a particular embodiment, the OSS/BSS gateway 844 includes operation systems and support (OSS) data, as well as billing systems and support (BSS) data. In one embodiment, the OSS/BSS gateway may provide or restrict access to an OSS/BSS server 864 that stores operations and billing systems data.

Further, the second APP switch 840 may be coupled to a domain controller 846 that provides web access, for example, to users via the public network 812. For example, the domain controller 846 may provide remote web access to IPTV account information via the public network 812, which users may access using their personal computers 868. The second APP switch 840 may be coupled to a subscriber and system store 848 that includes account information, such as account information that is associated with users who access the system 800 via the private network 810 or the public network 812. In a particular embodiment, the application tier 804 may also include a client gateway 850 that communicates data directly with the client-facing tier 802. In this embodiment, the client gateway 850 may be coupled directly to the CFT switch 830. The client gateway 850 may provide user access to the private network 810 and the tiers coupled thereto.

In a particular embodiment, the set-top box devices 816, 824 may access the IPTV system 800 via the private access network 866, using information received from the client gateway 850. In this embodiment, the private access network 866 may provide security for the private network 810. User devices may access the client gateway 850 via the private access network 866, and the client gateway 850 may allow such devices to access the private network 810 once the devices are authenticated or verified. Similarly, the client gateway 850 may prevent unauthorized devices, such as hacker computers or stolen set-top box devices from accessing the private network 810, by denying access to these devices beyond the private access network 866.

For example, when the first representative set-top box device 816 accesses the system 800 via the private access network 866, the client gateway 850 may verify subscriber information by communicating with the subscriber and system store 848 via the private network 810, the first APP switch 838, and the second APP switch 840. Further, the client gateway 850 may verify billing information and status by communicating with the OSS/BSS gateway 844 via the private network 810 and the first APP switch 838. In one embodiment, the OSS/BSS gateway 844 may transmit a query across the first APP switch 838, to the second APP switch 840, and the second APP switch 840 may communicate the query across the public network 812 to the OSS/BSS server 864. After the client gateway 850 confirms subscriber and/or billing information, the client gateway 850 may allow the set-top box device 816 access to IPTV content and VOD content. If the client gateway 850 is unable to verify subscriber information for the set-top box device 816, e.g., because it is connected to an unauthorized twisted pair, the client gateway 850 may block transmissions to and from the set-top box device 816 beyond the private access network 866.

As indicated in FIG. 8, the acquisition tier 806 includes an acquisition tier (AQT) switch 852 that communicates with the private network 810. The AQT switch 852 may also communicate with the operations and management tier 808 via the public network 812. In a particular embodiment, the AQT switch 852 may be coupled to a live acquisition server 854 that receives television or movie content, for example, from content sources 856 through an encoder 855. In a particular embodiment during operation of the IPTV system, the live acquisition server 854 may acquire television or movie content. The live acquisition server 854 may transmit the television or movie content to the AQT switch 852 and the AQT switch 852 may transmit the television or movie content to the CFT switch 830 via the private network 810.

Further, the television or movie content may be transmitted to the video content servers 880, where it may be encoded, formatted, stored, or otherwise manipulated and prepared for communication to the set-top box devices 816, 824. The CFT switch 830 may communicate the television or movie content to the modems 814, 822 via the private access network 866. The set-top box devices 816, 824 may receive the television or movie content via the modems 814, 822, and may transmit the television or movie content to the television monitors 818, 826. In an illustrative embodiment, video or audio portions of the television or movie content may be streamed to the set-top box devices 816, 824.

Further, the AQT switch may be coupled to a video-on-demand importer server 858 that stores television or movie content received at the acquisition tier 806 and communicates the stored content to the VOD server 836 at the client-facing tier 802 via the private network 810. Additionally, at the acquisition tier 806, the VOD importer server 858 may receive content from one or more VOD sources outside the IPTV system 800, such as movie studios and programmers of non-live content. The VOD importer server 858 may transmit the VOD content to the AQT switch 852, and the AQT switch 852, in turn, may communicate the material to the CFT switch 830 via the private network 810. The VOD content may be stored at one or more servers, such as the VOD server 836.

When a user issues requests for VOD content via the set-top box devices 816, 824, the requests may be transmitted over the private access network 866 to the VOD server 836, via the CFT switch 830. Upon receiving such requests, the VOD server 836 may retrieve the requested VOD content and transmit the content to the set-top box devices 816, 824 across the private access network 866, via the CFT switch 830. The set-top box devices 816, 824 may transmit the VOD content to the television monitors 818, 826. In an illustrative embodiment, video or audio portions of VOD content may be streamed to the set-top box devices 816, 824.

FIG. 8 further illustrates that the operations and management tier 808 may include an operations and management tier (OMT) switch 860 that conducts communication between the operations and management tier 808 and the public network 812. In the embodiment illustrated by FIG. 8, the OMT switch 860 is coupled to a TV2 server 862. Additionally, the OMT switch 860 may be coupled to an OSS/BSS server 864 and to a simple network management protocol (SNMP) monitor 878 that monitors network devices within or coupled to the IPTV system 800. In a particular embodiment, the OMT switch 860 may communicate with the AQT switch 852 via the public network 812.

In an illustrative embodiment, the live acquisition server 854 may transmit the television or movie content to the AQT switch 852, and the AQT switch 852, in turn, may transmit the television or movie content to the OMT switch 860 via the public network 812. In this embodiment, the OMT switch 860 may transmit the television or movie content to the TV2 server 862 for display to users accessing the user interface at the TV2 server 862. For example, a user may access the TV2 server 862 using a personal computer (PC) 868 coupled to the public network 812.

Figure 9:
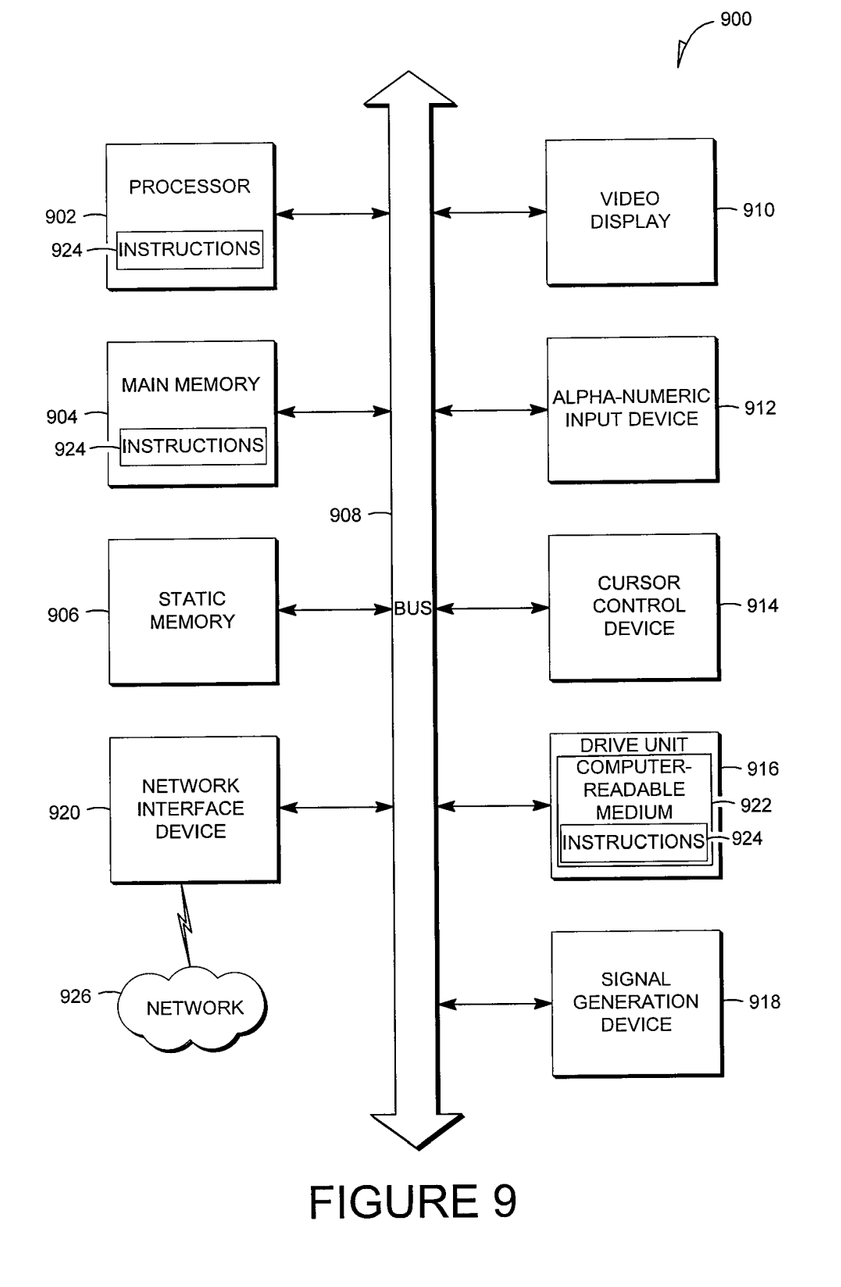
FIG. 9 illustrates a diagrammatic representation of a machine in the example form of a computer system within which a set of instructions for causing the machine to perform any one or more of the methodologies discussed herein may be executed.

FIG. 9 shows a diagrammatic representation of machine in the example form of a computer system 900 within which a set of instructions may be executed causing the machine to perform any one or more of the methods, processes, operations, or methodologies discussed herein. The provider 102 and/or the video sources 112 may be deployed on the computer system 900. The display devices 106.1, 106.2 and/or the receiver device 108 may include the functionality of the computer system 900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a STB, a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker) and a network interface device 920.

The drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules ma also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for providing subscription data have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory computer-readable storage device comprising computer instructions which, responsive to being executed by a media processor, cause the media processor to perform operations comprising:

receiving subscription data associated with a subscription to a syndicated feed, wherein the subscription data comprises syndication data, textual data, advertisement data, and combinations thereof;

providing video content for presentation;

accessing keywords associated with the video content, wherein the accessing of the keywords comprises accessing an electronic programming guide associated with the video content, accessing closed captioning data associated with the video content, accessing metadata associated with the video content, accessing a watermark associated with the video content, accessing image recognition data associated with the video content, and accessing an audio recognition output associated with the video content;

detecting a relationship between the keywords and the subscription data;

making a determination whether the subscription data is contextually relevant to the video content responsive to the detecting of the relationship between the keywords and the subscription data;

providing the subscription data for presentation in accordance with the determination;

generating a feed identification of the syndicated feed;

receiving a feed request;

subscribing to the syndicated feed in accordance with the feed request;

presenting the feed identification of the syndicated feed, wherein the feed request is received in response to presenting the feed identification; and altering billing information associated with a subscriber account in accordance with the providing of the subscription data, wherein the feed identification is provided in accordance with a combination of geographic information associated with or determined from the subscriber account, a viewing profile based on video content viewing habits, and demographic information of a subscriber associated with the media processor, wherein the feed request is received in response to presenting the feed identification, and wherein the feed identification is presented in accordance with: the viewing profile based on the video content viewing habits detected at the media processor, a user profile, the demographic information of the subscriber, and the geographic information associated with the subscriber account.

2. The non-transitory computer-readable storage device of claim 1, wherein the receiving of the subscription data is in accordance with the viewing profile.

3. The non-transitory computer-readable storage device of claim 2, wherein the operations further comprise:
identifying previous video content provided for presentation; and
developing the viewing profile in accordance with identification of the previous video content.

4. The non-transitory computer-readable storage device of claim 1, wherein the syndicated feed is at least one of an Really Simple Syndication feed, an Atom feed, or combinations thereof.

5. The non-transitory computer-readable storage device of claim 1, wherein the operations further comprise:
identifying the video content provided for presentation to a presentation device communicatively coupled to the media processor, wherein the determination of whether the subscription data is contextually relevant to the video content is in accordance with the identifying of the video content.

6. The non-transitory computer-readable storage device of claim 1, wherein the operations further comprise:
identifying a content source of the video content, wherein the determination whether the subscription data is contextually relevant to the video content in accordance with an identification of the content source.

7. The non-transitory computer-readable storage device of claim 1, wherein the operations further comprise:
accessing the demographic information of the subscriber, wherein the receiving of the subscription data is in accordance with the demographic information.

8. The non-transitory computer-readable storage device of claim 1, wherein the subscription data is provided for presentation in an overlapping portion of the video content.

9. A method comprising:
receiving, by a media processor, subscription data associated with a subscription to a syndicated feed, wherein the subscription data comprises syndication data, textual data, and advertisement data;
providing, by the media processor, video content for presentation;
accessing, by the media processor, keywords associated with the video content, wherein the accessing of the keywords comprises accessing an electronic programming guide associated with the video content, accessing closed captioning data associated with the video content, accessing metadata associated with the video content, accessing a watermark associated with the video content, accessing image recognition data associated with the video content, and accessing an audio recognition output associated with the video content;
detecting, by the media processor, a relationship between the keywords and the subscription data;
making a determination at the media processor whether the subscription data is contextually relevant to the video content responsive to detecting the relationship between the keywords and the subscription data;
providing, by the media processor, the subscription data for presentation in accordance with the determination;
generating, by the media processor, a feed identification of the syndicated feed;
receiving, by the media processor, a feed request;
subscribing, by the media processor, to the syndicated feed in accordance with the feed request;
presenting, by the media processor, the feed identification of the syndicated feed; and
altering, by the media processor, billing information associated with a subscriber account in accordance with the providing of the subscription data,
wherein the feed identification is provided in accordance with a combination of geographic information associated with or determined from the subscriber account, a viewing profile based on video content viewing habits, and demographic information of a subscriber associated with the media processor,
wherein the feed request is received in response to presenting the feed identification, and
wherein the feed identification is presented in accordance with: the viewing profile based on the video content viewing habits detected at the media processor, a user profile, the demographic information of the subscriber, and the geographic information associated with the subscriber account.

10. A system comprising:
a memory to store executable instructions; and
a processor coupled with the memory, wherein the processor, responsive to executing the executable instructions, performs operations comprising:
receiving subscription data associated with a subscription to a syndicated feed, wherein the subscription data comprises syndication data, textual data, advertisement data, and combinations thereof;
providing video content for presentation;
accessing keywords associated with the video content, wherein the accessing of the keywords comprises accessing an electronic programming guide associated with the video content, accessing closed captioning data associated with the video content, accessing metadata associated with the video content, accessing a watermark associated with the video content, accessing image recognition data associated with the video content, and accessing an audio recognition output associated with the video content;
detecting a relationship between the keywords and the subscription data;
making a determination whether the subscription data is contextually relevant to the video content responsive to the detecting of the relationship between the keywords and the subscription data;
providing the subscription data for presentation in accordance with the determination;
generating a feed identification of the syndicated feed;
receiving a feed request;
subscribing to the syndicated feed in accordance with the feed request;
presenting the feed identification of the syndicated feed, wherein the feed request is received in response to presenting the feed identification; and
altering billing information associated with a subscriber account in accordance with the providing of the subscription data,
wherein the feed identification is provided in accordance with a combination of geographic information associated with or determined from the subscriber account, a viewing profile based on video content viewing habits, and demographic information of a subscriber associated with the processor,
wherein the feed request is received in response to presenting the feed identification, and
wherein the feed identification is presented in accordance with: the viewing profile based on the video content viewing habits detected at the processor, a user profile, the demographic information of the subscriber, and the geographic information associated with the subscriber account.

11. The system of claim 10, wherein the receiving of the subscription data is in accordance with the viewing profile.

12. The system of claim 10, wherein the operations further comprise:
   identifying previous video content provided for presentation; and
   developing the viewing profile in accordance with identification of the previous video content.

13. The system of claim 10, wherein the syndicated feed is at least one of an Really Simple Syndication feed, an Atom feed, or combinations thereof.

14. The system of claim 10, wherein the operations further comprise:
   identifying the video content provided for presentation to a presentation device communicatively coupled to the processor, wherein the determination of whether the subscription data is contextually relevant to the video content is in accordance with the identifying of the video content.

15. The system of claim 10, wherein the operations further comprise:
   identifying a content source of the video content, wherein the determination whether the subscription data is contextually relevant to the video content in accordance with an identification of the content source.

16. The system of claim 10, wherein the operations further comprise:
   accessing the demographic information of the subscriber, wherein the receiving of the subscription data is in accordance with the demographic information.

17. The system of claim 10, wherein the subscription data is provided for presentation in an overlapping portion of the video content.

* * * * *